(12) United States Patent
House

(10) Patent No.: US 9,790,694 B2
(45) Date of Patent: *Oct. 17, 2017

(54) CONSTRUCTION SAFETY HANDRAIL AND TOEBOARD SYSTEM

(71) Applicant: John House, San Diego, CA (US)

(72) Inventor: John House, San Diego, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/854,032

(22) Filed: Mar. 29, 2013

(65) Prior Publication Data

US 2013/0256491 A1    Oct. 3, 2013

Related U.S. Application Data

(60) Provisional application No. 61/617,656, filed on Mar. 29, 2012.

(51) Int. Cl.
*A47F 5/00* (2006.01)
*E04G 5/06* (2006.01)
*F16M 13/00* (2006.01)
*E04G 21/32* (2006.01)
*E04G 5/00* (2006.01)

(52) U.S. Cl.
CPC ............. *E04G 5/061* (2013.01); *E04G 5/001* (2013.01); *E04G 21/3223* (2013.01); *F16M 13/00* (2013.01)

(58) Field of Classification Search
CPC ... E04F 11/18; E04F 11/1817; E04F 11/1819; E04H 2017/1447; E04H 2017/1452; E04H 2017/1456; E04H 2017/1473; E04G 5/061; E04G 5/001; E04G 21/3223; F16M 13/00

USPC .......... 248/316.8, 237; 256/65.01, 65.14, 59, 256/60, 64; 403/205; 182/112–113
See application file for complete search history.

(56) References Cited

U.S. PATENT DOCUMENTS

| 859,239 | A | * | 7/1907 | McFall | ................... E04H 17/10 256/19 |
| 949,394 | A | * | 2/1910 | Daly | ..................... E04B 1/2403 135/909 |
| 3,776,521 | A | * | 12/1973 | Weinert | ................ E01F 13/022 256/24 |
| 4,381,160 | A | * | 4/1983 | Grimm | ............... E04H 12/2261 248/357 |
| 4,413,761 | A | * | 11/1983 | Angel | ...................... B60R 9/06 211/86.01 |

(Continued)

OTHER PUBLICATIONS http://www.engineeringtoolbox.com/softwood-lumber-dimensions-d_1452. html.*

*Primary Examiner* — Christopher E Garft
(74) *Attorney, Agent, or Firm* — Gary L. Eastman, Esq.; Eastman & McCartney LLP

(57) ABSTRACT

A versatile handrail and toeboard safety system that provides flexible solutions for the implementation of improved construction site safety barriers using a specialized bracket to mount standard wooden members. The bracket of the handrail and toeboard safety system is formed of multiple parallel plates in various arrangements creating spaces to receive and secure wooden construction members as a handrail for personnel safety in addition to a toeboard for equipment and materiel safety. Multiple embodiments of the bracket provide for expeditious setup and removal of system for setup and removal of personnel and equipment safety barriers from most construction sites.

3 Claims, 12 Drawing Sheets

(56) References Cited

U.S. PATENT DOCUMENTS

| | | | | |
|---|---|---|---|---|
| 5,560,588 | A | * | 10/1996 | Hilliard .............. E04H 12/2269 256/59 |
| 6,038,829 | A | * | 3/2000 | Franks ..................... E04G 3/26 182/113 |
| 7,234,689 | B2 | * | 6/2007 | Kuenzel .............. E04G 21/3233 182/106 |
| 2006/0011901 | A1 | * | 1/2006 | Anson ................... E01F 13/022 256/65.14 |
| 2008/0006809 | A1 | * | 1/2008 | Stoffels ................ E01F 13/022 256/67 |
| 2009/0095947 | A1 | * | 4/2009 | Supples .............. E04G 21/3223 256/64 |

* cited by examiner

CONSTRUCTION SAFETY HANDRAIL AND TOEBOARD SYSTEM

RELATED APPLICATION

This application claims the benefit of priority to U.S. Provisional Patent Application Ser. No. 61/617,656 for a "Construction Safety Handrail And Toe Board System" filed Mar. 29, 2012, and currently co-pending.

FIELD OF THE INVENTION

The present invention relates generally to construction safety systems. The present invention is more particularly, though not exclusively, useful as an improved safety system for construction sites, providing an expeditious system for setup and removal of personnel and equipment safety barriers.

BACKGROUND OF THE INVENTION

Construction barriers for personnel and equipment have historically been made of building materials available at a construction site, such as sheets of plywood and two-by-fours, hard-mounted to the floor of construction sites by way of nails or bolts. This type of barrier is constructed primarily for safety, as they are typically employed near the edge of a working area on the second floor (or higher) of a construction site for purposes of preventing personnel and equipment from falling off the edge of a work area to the floor or ground below. The barriers provide a measure of safety as people work near the edge of the construction site.

Traditionally, these safety barriers have been mounted to the floor of the second or third story of a home construction site, where a single story floor can be as high as 20 feet from the ground. Equipment falling from that height would certainly be damaged, but may also cause serious injury or death if it were to impact someone standing below. In an effort to reduce the likelihood of equipment damage and personnel injury, wooden barriers are typically erected to keep equipment, personnel, and debris from falling off a construction site. Typically mounted to the vertical members (studs) of a home construction site or other larger commercial buildings, these barriers usually employ a handrail three to four feet tall for personnel safety, in addition to a further barrier on or near the floor, preventing equipment and debris from sliding or rolling off the second (or higher) story of the construction site. Ordinarily, two-by-fours are used and simply nailed together in vertical and horizontal supports to create a fence, of sorts. Often plywood is nailed to the outside creating a more secure, yet resource-intensive wall. The amount of wood used is heavy, making even a small barrier cumbersome, time consuming, difficult to erect, even harder to remove, and uses an inordinate amount of building material to construct.

In light of the above, it would be advantageous to provide a bracket and support system that utilizes fewer building resources, increases safety and productivity, while significantly reducing the time for setup and removal of these safety barriers.

SUMMARY OF THE INVENTION

The handrail and toeboard system of the present invention makes the process by which construction site safety barriers are erected and dismantled significantly more expeditious and less resource-intensive. An embodiment of the present invention is contemplated as a bracket and a support system that provides a connection point for securing the system to the floor of a construction site. The bracket provides mounting points for wooden safety barrier members comprising support rails, handrails, and toeboards. By using several brackets in conjunction with the wooden safety barrier members, a safety barrier can be erected quickly and easily.

The present invention is formed from a plurality of orthogonally arranged, vertical metal plates, spaced apart to accommodate and secure both horizontal and vertical wooden members, such as a two-by-four, or similar. The handrail and toeboard system has an open ended bottom, arranging wooden safety barrier members flush to the ground with zero clearance between the floor and the wooden members, preventing tools, materials, and debris from slipping through any cracks or spaces. The present invention is further formed with horizontally opposed metal tabs on the bottom portion of the metal plates serving as mounting points for the bracket.

Alternative embodiments of the invention include wood-receiving brackets which are articulatable to accommodate placement at different, non-orthogonal, angles along floor, and are particularly useful in circumstances where the floor plan of the construction site is not formed with rectangular corners.

DESCRIPTION OF THE DRAWING

The objects, features, and advantages of the apparatus of the present invention will be more clearly perceived from the following detailed description, when read in conjunction with the accompanying drawing, in which.

DETAILED DESCRIPTION

Figure 1:
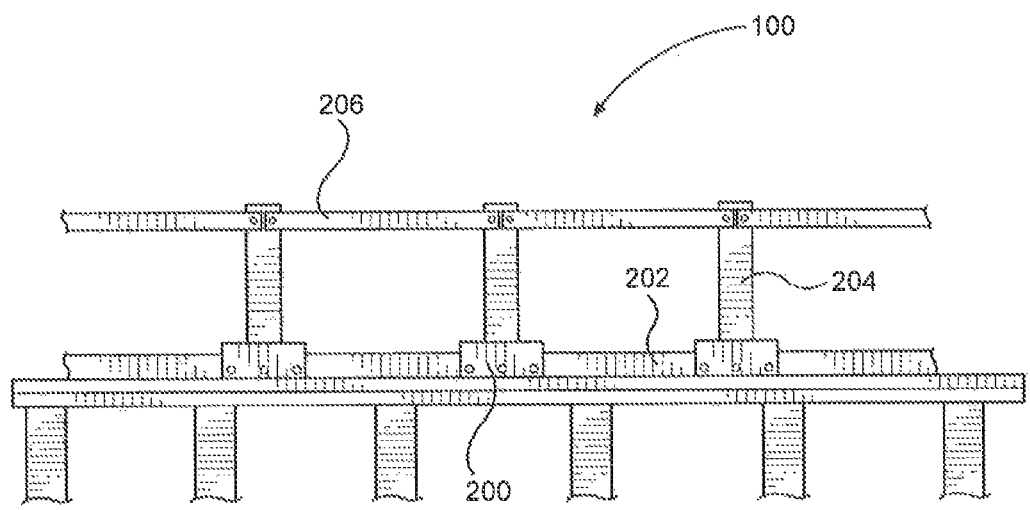
FIG. 1 is a diagrammatic view of a preferred embodiment of the handrail and toeboard system of the present invention, showing the handrail and toeboard safety barrier secured to the floor of a construction site, with multiple wooden members creating a toeboard, handrail, and vertical handrail support.

Referring initially to FIG. 1, a safety handrail and toeboard system safety barrier ("safety barrier") of the present invention is shown and generally designated 100. An exemplary construction site is depicted as a partially finished two-story home. Safety barrier 100 is erected on the second floor, utilizing the handrail and toeboard system brackets 200 of the present invention. Safety barrier 100 incorporates toeboard 202, handrail support 204, and handrail 206, all typically wooden members of standard construction dimensions. It is to be appreciated that there are multiple standard dimensions for lumber used in construction. The exemplary use of a "two-by-four" wooden member is not intended to be limiting, as the handrail and toeboard system of the present invention may be formed of wooden members of various other dimensions such as a one-by-four, or even four-by-four wooden members.

A preferred embodiment of bracket 200 is formed from a single or multiple pieces of steel, formed, forged, welded, or otherwise affixed together to form a solid and strong structure. Other materials known in the art with similar strength characteristics are also contemplated, Materials such as a durable injection-molded plastic, acrylonitrile butadiene styrene (ABS), some thermoplastics, or other engineering plastics known in the art are useful in the construction of bracket 200 and for the following embodiments discussed below.

As shown in this Figure, a preferred embodiment of a bracket 200 of the present invention features a toeboard 202 and a handrail support 204 secured to a bracket 200. Multiple brackets 200 are employed in order to provide a safety barrier 100 that runs the perimeter of the second floor of a construction site. Toeboard 202 established a direct contact to the floor, with a zero gap, and provides a ledge that eliminates the clearance between the floor and the toeboard 202 to prevent equipment, material, and debris from sliding or rolling off the edge of a construction site. This is an important feature, capable of replication, but not required, in each of the embodiments discussed below.

Further, handrail support 204 provides a convenient place to secure additional handrail sections 206 to create a handrail and personnel barrier that also runs the perimeter of the construction site and completes safety barrier 100. As shown below, toeboards 202 and handrail supports 204 are quickly and easily secured to or removed from brackets 200 with the use of nails, screws, or bolts. Similarly, brackets 200 are secured to the floor with screws or bolts through the use of flanges 208 (shown in later Figures) formed perpendicular to the base of brackets 200, and of the other embodiments discussed.

Figure 2:
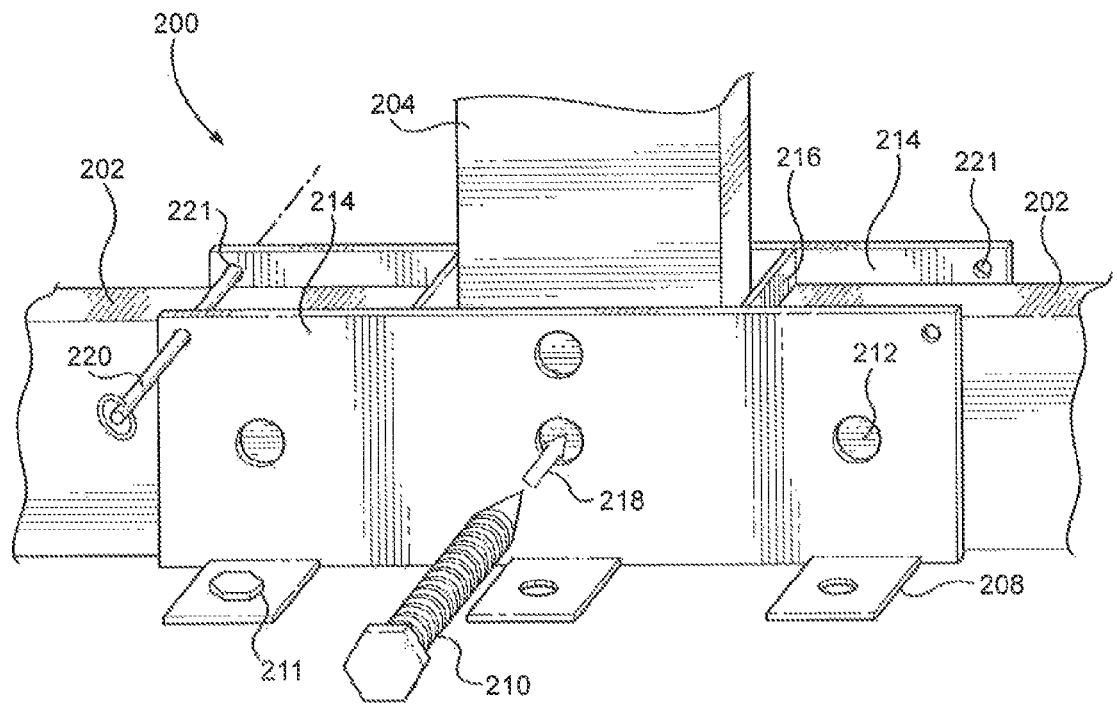
FIG. 2 is an isometric view of the top-front of a preferred embodiment of a bracket of the handrail and toeboard system of FIG. 1 showing the position of a handrail support and two (2) toeboards as they interact with vertical plates and support plates of the bracket, in addition to hardware securing the wooden members to the bracket and the flanges used to secure the entire system to the floor.

Referring now to FIG. 2, a perspective view of the top-front of a preferred embodiment of a bracket of the present invention is shown, and generally designated 200. Bracket 200 includes vertical plates 214, arranged in a parallel fashion, spaced apart at a sufficient distance to accommodate a standard two-by-four section of lumber, or other standard construction dimension, for use as toeboard 202 or handrail support 204. Support plates 216 are attached in place to provide structural support to vertical plates 214 and a mounting surface for handrail support 204 in the middle of bracket 200.

Bracket 200 is formed to accommodate three sections of lumber: two toeboards 202 and one handrail support 204. Holes 212 are formed into the face of the vertical plates 214 in multiple areas in order to accept mounting hardware 210 and provide an attachment point for toeboards 202 and handrail support 204 to bracket 200. Mounting hardware 210 is moved in direction 218 through holes 212 into toeboards 202 and handrail support 204 to secure all three sections of lumber in place. Alternatively, a pin 220 may be inserted through holes 221 formed in the vertical plates 214 to prevent the toeboard 202 from lifting upwards and out of the bracket 200. The use of two brackets 200 will prevent the toeboards from moving in any other direction by locking the toeboard 202 between the brackets 200. The user can easily remove the toeboard 202 by pulling out the pin and lifting the toeboard 202 up and out. To prevent loss of pin 220, it may be attached to bracket 200 using a wire, chain, or other similar material. The bottom of bracket 200 is open, allowing toeboards 202 and handrail support 204 to directly contact the floor. Similar to mounting hardware 210, a plurality of flanges 208 are sized to receive mounting hardware 211 such as nails, screws, or bolts, to secure bracket 200 to the floor of a construction site, providing support to the entire safety barrier 100 comprising handrail supports 204 and toeboards 202. Flanges 208 are spaced evenly apart on each side of the bracket 200 to provide adequate strength to support the handrail support 204 and toeboards 202, such as the strength requirement to withstand a force of at least 200 pounds as outlined in California Code of Regulations, Title 8 §1620. Multiple brackets 200 are then spaced around the perimeter of a construction site in order to provide a quick and easy method for erection of a safety barrier 100.

Figure 3:
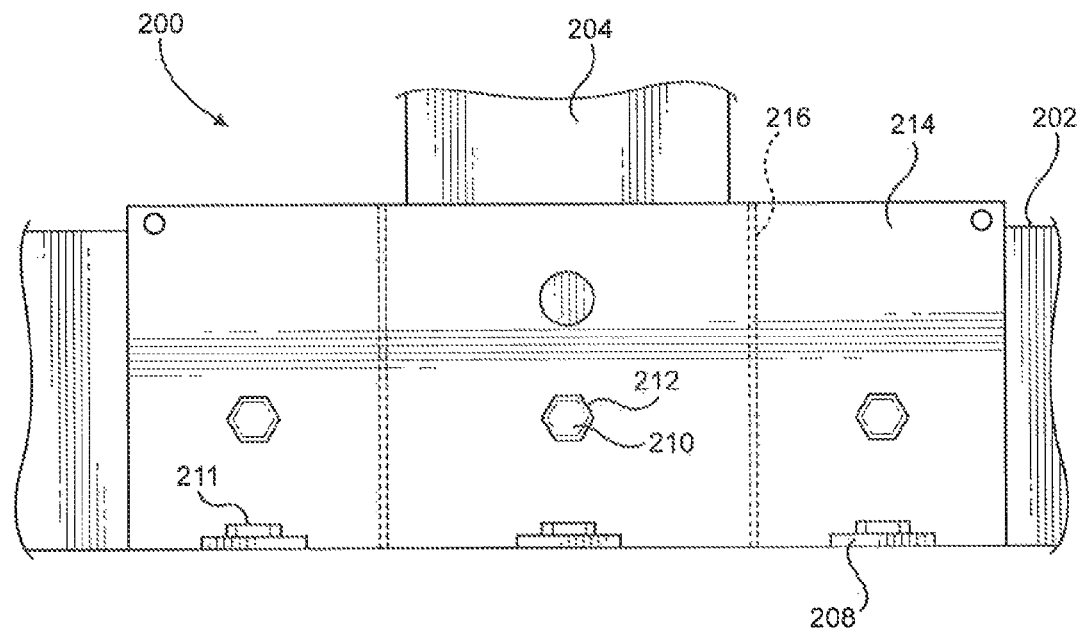
FIG. 3, is a side view of the bracket of FIG. 2, depicting two (2) vertical plates, six (6) bolts acting as mounting hardware, and flanges used to secure the system to the floor, and showing the placement of the toeboard immediately adjacent the floor surface to prevent the formation of any gap therebetween.

Referring now to FIG. 3, a side view of bracket 200 is shown, with toeboard 202 and handrail support 204 secured in place, using mounting hardware 210. In an embodiment, mounting hardware 210 may be a nail, screw, or bolt. The simplest method of securing either toeboard 202 or handrail support 204 to bracket 200 is through the use of a hole 212 formed in the side of vertical plate 214 through which a nail is driven, securing the toeboard 202 and handrail support 204 in place. In an embodiment, hole 212 is sized to accept screws driven into any of the three wooden members, providing a reusable system, as the screws may be extracted from the wood and used again. Alternatively, a cinch-set system may be employed wherein holes 212 are internally threaded to accept a suitably sized bolt with matching external threads that is tightened and cinched against the toeboard 202 and handrail support 204, driving the bolt into the wood of toeboard 202 or handrail support 204, or at least providing sufficient friction to secure the wooden members in place. Ranges 208 are equally spaced apart with each flange 208 located approximately in the middle of each section to provide localized strength to each section. The flanges 208 are attached to the side of vertical plate 214 with the bottom edge of flanges 208 flush with the bottom edge of vertical plate 214.

Figure 4:
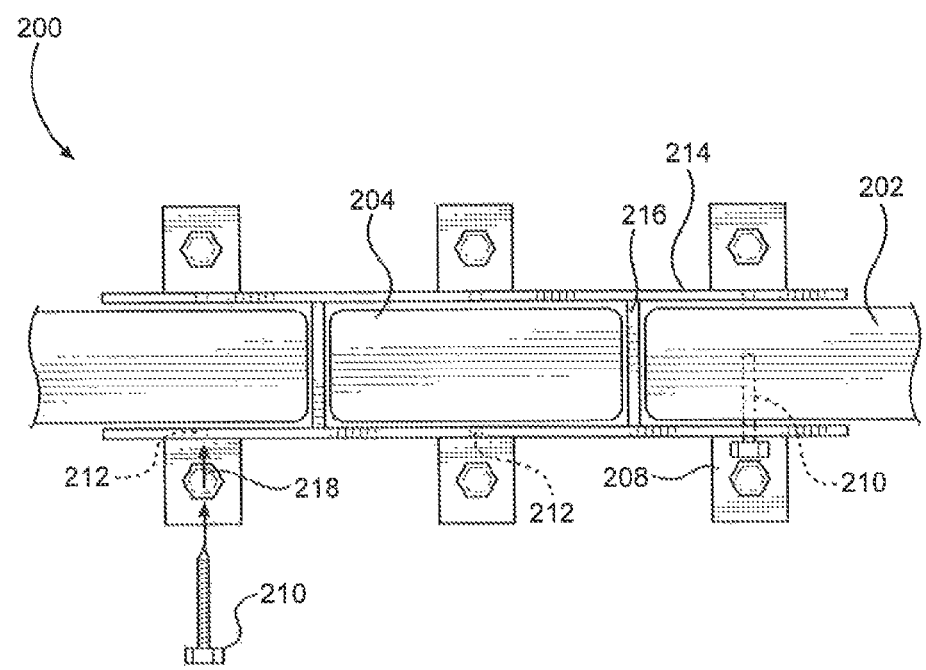
FIG. 4 is a top view of the bracket of FIG. 2, depicting two (2) parallel plates and two (2) support plates, creating a space for a vertical handrail support, six (6) bolts acting as mounting hardware, and flanges used to secure the system to the floor.

Referring now to FIG. 4, a top view of a preferred embodiment of bracket 200 of FIG. 3 is shown. A section of toeboard 202 and a section of handrail support 204 are secured to bracket 200 with the use of mounting hardware 210. Bracket 200 includes vertical plates 214, arranged in a parallel fashion, spaced apart at a sufficient distance to accommodate a standard two-by-four section of lumber, or other standard construction dimension, for use as toeboard 202 or handrail support 204. Support plates 216 are formed or otherwise attached in a perpendicular manner to vertical plate 214 to provide structural support to vertical plates 214 and mounting surface for handrail support 204 in the center of bracket 200, Flanges 208 are located on both sides of bracket 200, with each flange 208 having a corresponding flange 208 on the opposite side to provide localized and overall strength and stability to the bracket 200.

Figure 5:
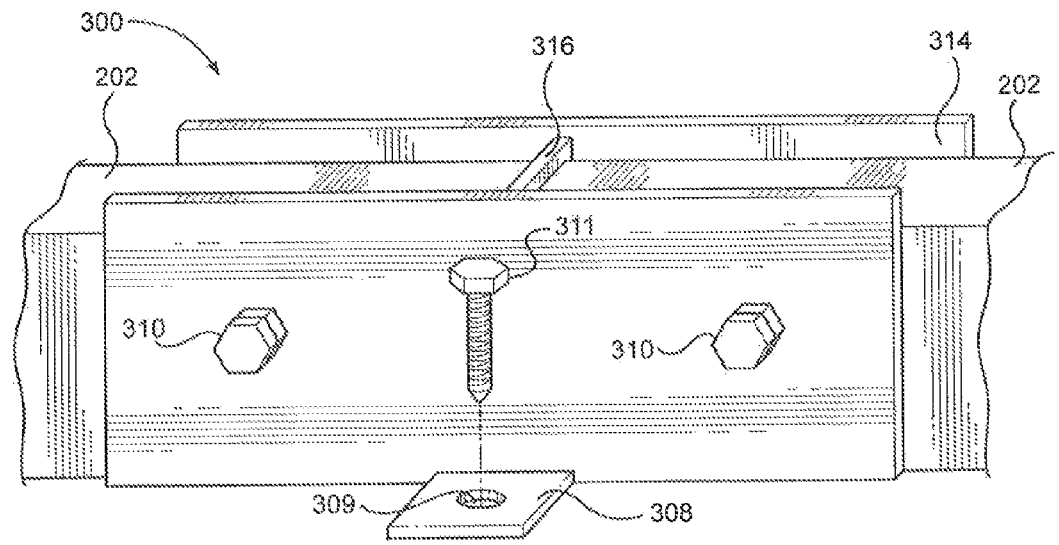
FIG. 5 is an isometric view of the top-front of an alternative preferred embodiment of the handrail and toeboard system of the present invention, depicting a bracket with two (2) parallel plates, a single support plate, mounting hardware for toeboards, and flanges for securing the system to the floor.

Referring now to FIG. 5, a perspective view of an alternative preferred embodiment of a bracket of the present invention is shown and generally designated 300. In this Figure, bracket 300 is formed from two vertical plates 314 similar to FIG. 2, but only one support plate 316, eliminating the area in which handrail support 204 is mounted. This embodiment of bracket 300 is for use with toeboards 202 when a safety barrier 100 does not require handrail supports 204 or handrail sections 206, The bottom of bracket 300 is open, allowing toeboards 202 to directly contact the floor. The space between vertical plates 314 is adapted for use with two-by-four wooden construction material, but it is to be appreciated by those skilled in the art that the size of bracket 300 may be adapted to fit any standard size lumber dimension. Holes are formed in the sides of the plates 314 to accept mounting hardware 310, securing the toeboards 202. Flanges 308 further are formed with holes 309 to accept mounting hardware 311 for securing the bracket 300 to the floor.

Figure 6:
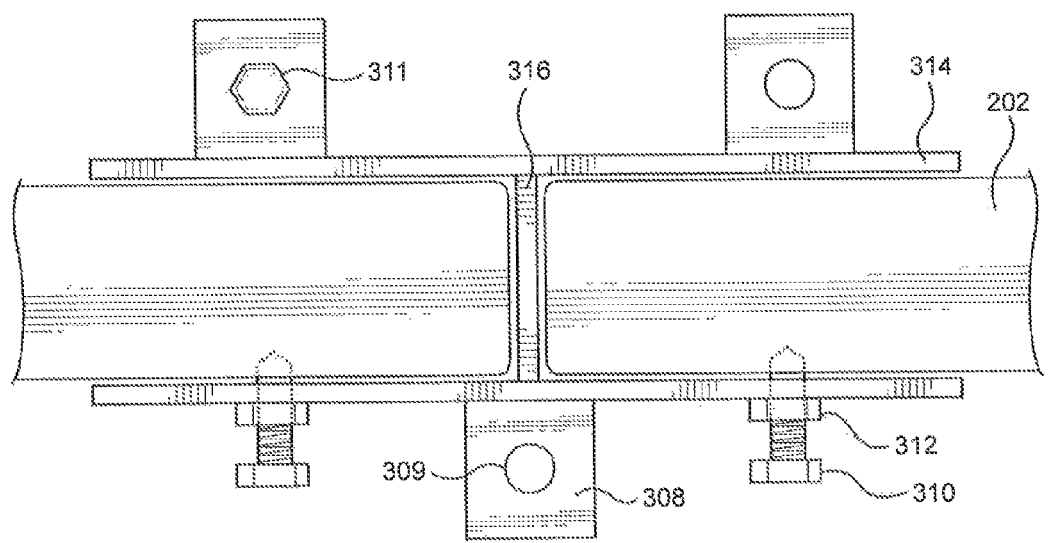
FIG. 6 is a top view of the top of the alternative preferred embodiment of FIG. 5, depicting two (2) vertical plates, single support plate, mounting hardware for toeboards, and flanges for securing the system to the floor.

Referring now to FIG. 6 the top view of bracket 300 is shown, Vertical plates 314 and support plate 316 are again formed to accept standard sized lumber, such as a two-by-four. In this embodiment, bracket 300 joins two abutting toeboards 202. Using fasteners 310 in combination with threaded fitting 312, the toeboards 202 can be installed quickly with minimal damage to the toeboards and can be removed just as quickly by simply reversing the threaded fastener 310 from fitting 312. Bracket 300 may be mounted to the floor using flanges 308 and hardware 311.

In the various preferred embodiments of the present invention, the toeboard receiving portions of the brackets include three sides, namely, two parallel vertical walls and an interconnecting vertical wall extending between the vertical walls. For example, with reference to FIG. 6, two vertical walls 314 are parallel, and an interconnecting vertical wall 316 cooperates with vertical walls 314 to form a U-channel sized to receive a toeboard 202. Importantly, and with reference back to FIG. 5, it is significant that no portion of bracket 300 is between toeboard 202 and the floor upon which the bracket 300 is mounted. As stated above, this direct contact between toeboard 202 and floor (not shown this Figure) eliminates any gap that is present with other prior art products. The absence of any gap provides a much higher degree of safety for the devices of the present invention.

Figure 7:
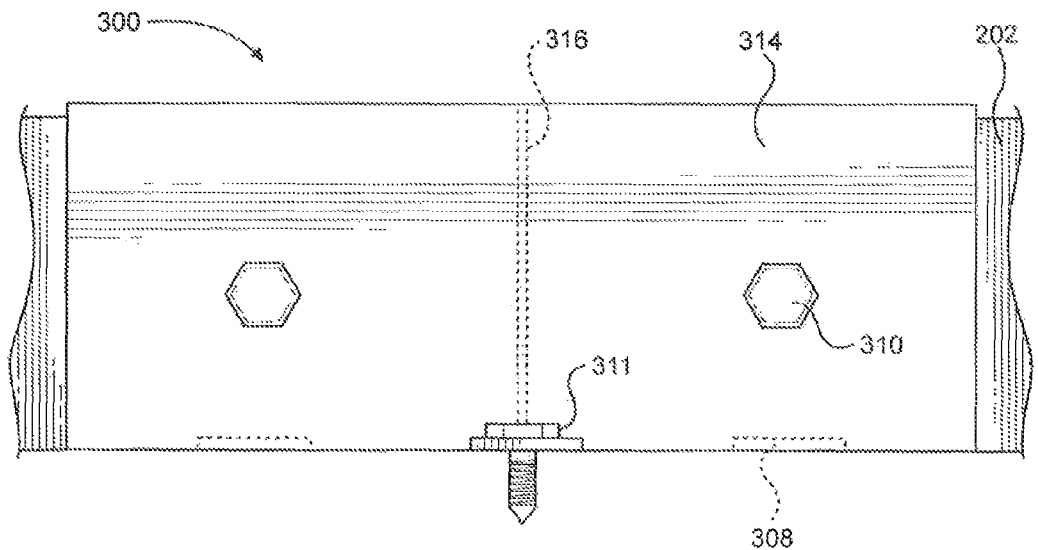
FIG. 7 is a side view of the alternative preferred embodiment of FIG. 5, depicting the side of one of the two (2) vertical plates, mounting hardware for toeboards, and flanges for securing the system to the floor.

Referring now to FIG. 7, a side view of bracket 300 is shown depicting the placement of toeboards 202 within bracket 300 and secured by threaded fastener 310 in direct contact with the floor eliminating the clearance between the toeboard 202 and floor, preventing equipment, material, and debris from sliding under the toeboard 202 and falling off the construction site. The three flanges 308 formed or otherwise affixed to the bottom of vertical plates 314 are shown. The center flange 308 is secured to the floor by mounting hardware 311, while the other two flanges 308 are shown in dashed lines where they appear on the opposite side of bracket 300.

Figure 8:
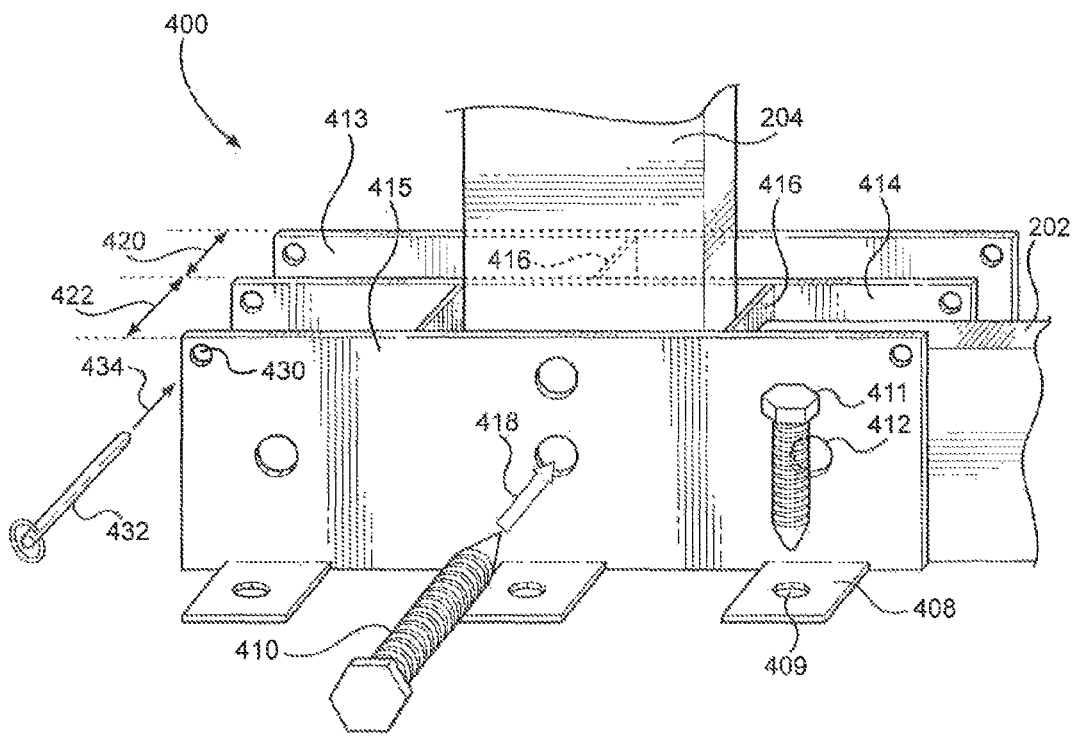
FIG. 8 is an isometric top view of an alternative embodiment of the handrail and toeboard system of the present invention, depicting a bracket with three (3) vertical plates disposed at different distances allowing the use of two (2) different dimensions of wooden members, three (3) support plates, mounting hardware for toeboards and vertical handrail support, and flanges for securing the system to the floor.

Referring now to FIG. 8, a perspective view of the top-front of an alternative embodiment of the present invention is shown and generally designated 400. Bracket 400 includes vertical plates 414 and 415, arranged in a parallel fashion, spaced apart at a sufficient distance 422 to accommodate a standard two-by-four section of lumber, or other standard construction dimension, for use as toeboard 202 or handrail support 204. Support plates 416 are formed or otherwise attached substantially perpendicular to vertical plates 415 and 414 providing structural support and a mounting surface for handrail support 204 in the middle of bracket 400, Vertical plate 413 is spaced apart from and behind vertical plate 414 a sufficient distance 420, which is generally smaller than the distance 422 between vertical plates 414 and 415. In this alternative embodiment, thickness 420 may be approximately one inch to receive board thickness 1" or less.

Bracket 400 is formed to accommodate five sections of lumber: four toeboards 202 and one handrail support 204. Holes 412 are formed into the face of the vertical plates 415 and 413 of bracket 400 in multiple areas in order to accept the mounting hardware 410 and provide attachment points for toeboards 202 and handrail support 204. Mounting hardware 410 is moved in direction 418 through holes 412 in vertical plate 415 into toeboards 202 and handrail support 204 to secure the front three sections of lumber in place. Mounting hardware 410 is moved in the opposite direction of 418 through holes 412 of vertical plate 413 into toeboards 202 to secure the back two toeboards 202 in place. Alternatively, pin 432 may be inserted through holes 430 to keep toeboards 202 from lifting up and out of bracket 400 instead of using the mounting hardware 410. Multiple brackets 400 are then spaced around the perimeter of a construction site in order to provide a quick and easy method for construction of a safety barrier 100 for personnel and equipment.

In an embodiment, in order to accommodate the pins 432, holes (not shown) are drilled through the toeboards 202 to receive the pins 432, in use. In an alternative embodiment, the vertical plates 413, 414, and 415 are taller that the toeboards 202 in use, and do not require the drilling of such holes through the toeboards, allowing the pins 432 to pass through the holes 430 over the top of toeboards 202 in use. This characteristic can be applied to any of the embodiments discussed herein. Additionally, by providing an apparatus that is capable of securing a toeboard within a bracket positioned immediately against the floor, and that is capable of being quickly removed, such as during the installation and removal process, the present invention is significantly more useful and far more efficient to use.

Figure 9:
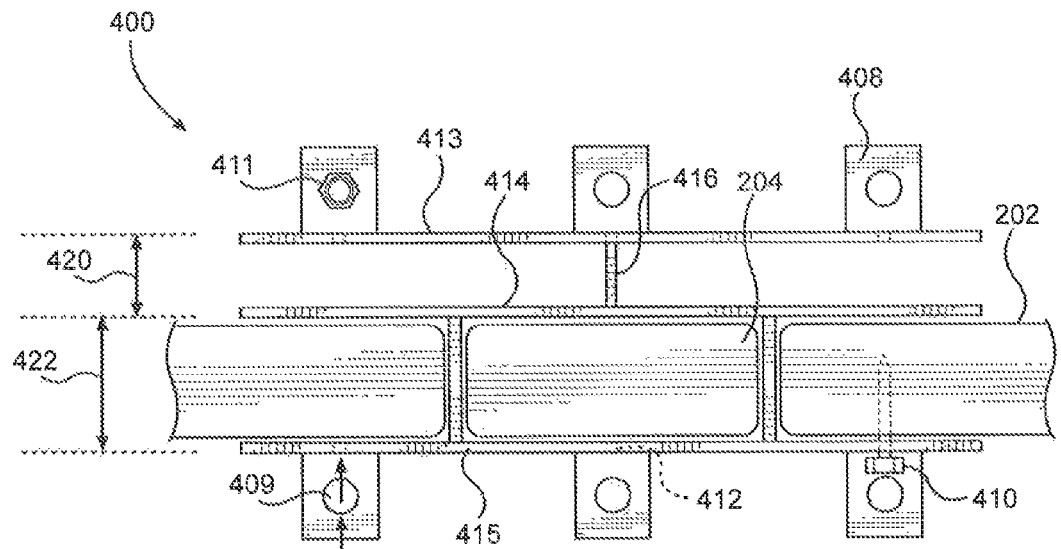
FIG. 9 is plan view of the alternative embodiment of the handrail and toeboard system of FIG. 8, depicting three (3) parallel plates disposed at different distances allowing the use of two (2) different dimensions of wooden members, three (3) support plates, mounting hardware for toeboards and vertical handrail support, and horizontal brackets for securing the system to the floor.

Referring now to FIG. 9, a top view of bracket 400 is shown, and depicts the placement of the front toeboards 202 and handrail support 204 secured within bracket 400. Flanges 408 are attached to the exterior of vertical plates 413 and 415 flush with the bottom of plates 413, 414, and 415 resulting in a flat bottom, to provide mounting points for bracket 400. The flanges 408 are formed with holes and allow the use of mounting hardware 411 or other mechanical fasteners to quickly and easily be used to mount bracket 400 to the construction site.

Figure 10:
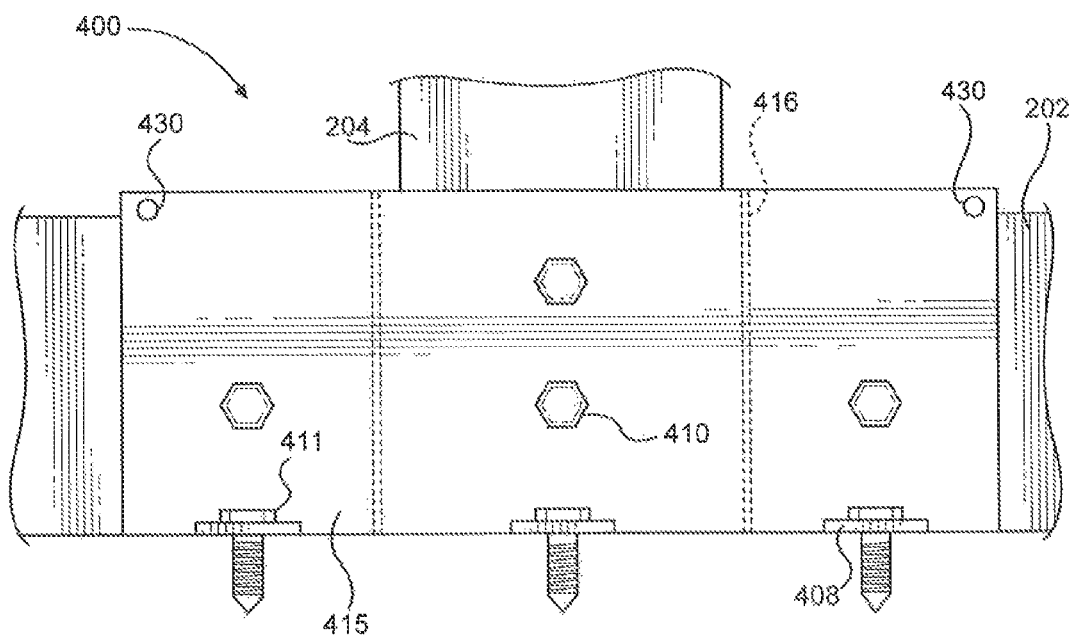
FIG. 10 is a side view of the alternative embodiment of the handrail and toeboard system of FIG. 8, depicting the side of a vertical plate, mounting hardware for toeboards and vertical handrail support, and horizontal brackets for securing the system to the floor.

Referring now to FIG. 10 is a side view of the bracket 400 showing the fasteners 210 used to secure the toeboards 202 and handrail support 204 to bracket 400. The toeboards 202 directly contact the floor eliminating any clearance between the toeboards 202 and the floor to prevent equipment, material, and debris from falling off the side of a construction site.

Figure 11:
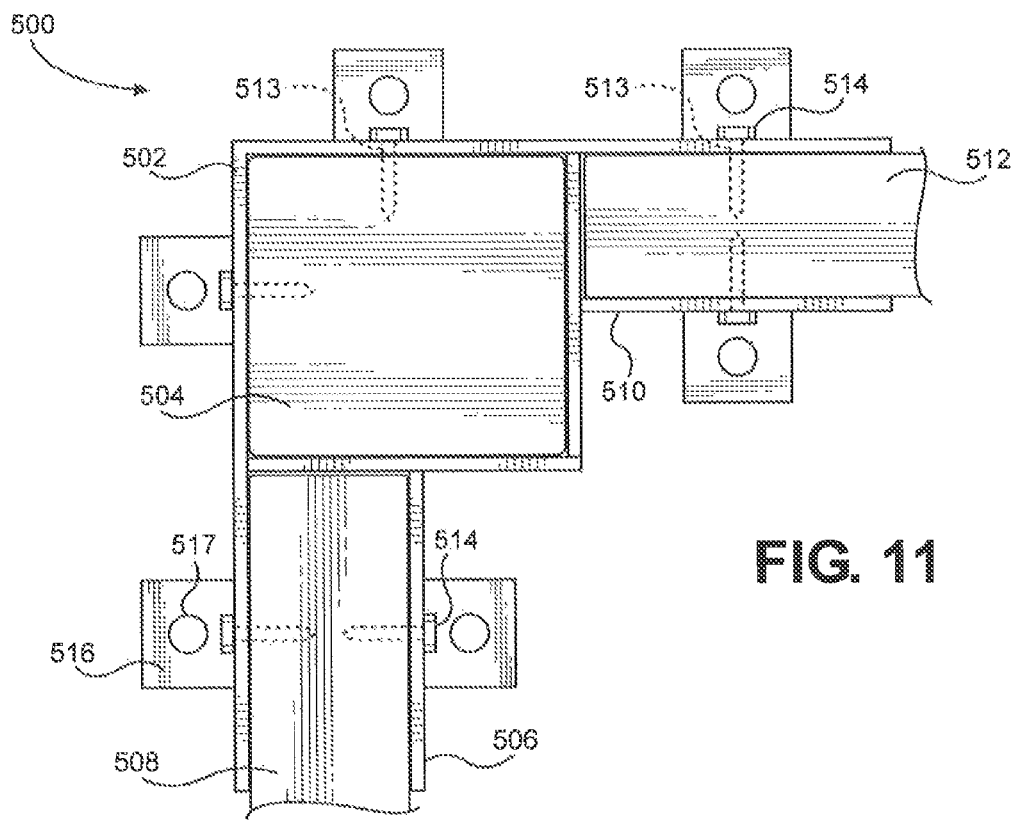
FIG. 11 is a top view of an alternative embodiment of the handrail and toeboard system of the present invention depicting a corner bracket having four (4) vertical plates orthogonally disposed, allowing the connection of two (2) toeboards at a right angle, two (2) support plates, mounting hardware for toeboards and vertical handrail support, and flanges for securing the system to the floor.

Referring now to FIG. 11, a top view of an alternative embodiment of a bracket of the handrail and toeboard system of the present invention is shown and generally designated 500. Bracket 500 includes a handrail support receiver 502 and two toeboard receivers 506 and 510. Handrail support receiver 502 comprises four vertical walls of predetermined height arranged to form a substantially square or rectangular cross section having open ends, sized to receive a handrail support 504 such as a four-by-four wooden member shown.

The four vertical walls provide a surface to support and mount handrail support 504. As shown, handrail support receiver is sized to receive a four-by-four, two two-by-fours, or other symmetrical wooden member, however it is to be appreciated that handrail support receiver 502 may also be sized to receive a single two-by-four or other non-symmetrical wooden member without departing from the invention. A pair of toeboard receivers 506 and 510 extends from the exterior wall of handrail support receiver 502 to create a ninety (90) degree angle between the two toeboards 202 installed within toeboard receivers 506 and 510.

Multiple holes 513 are formed in the exterior of bracket 500 and sized to accept mounting hardware 514. As before, mounting hardware 514 can be any practical fastener known in the art, such as nails, bolts, or screws. Quick release fasteners (not shown) such as pins 432 from FIG. 8 are also contemplated.

Multiple flanges 516 are formed or otherwise attached about the base of the bracket 500 and formed with holes 517 through which mounting hardware 518 (shown in FIG. 12) is used to fasten bracket 500 to the floor.

Bracket 500 is intended for use on corners to provide a secure mount for toeboards 508 and 512 and handrail supports 504. It is appreciated by those skilled in the art that bracket 500 may be adapted for use in any type of corner such as a 45 degree corner.

Figure 12:
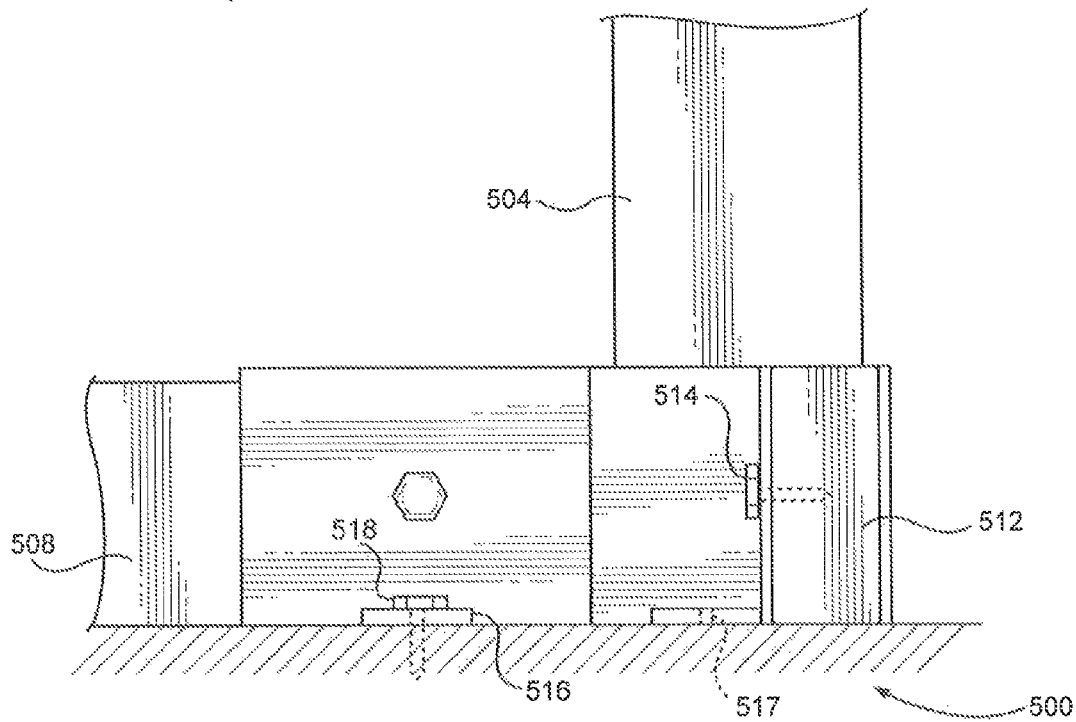
FIG. 12 is a side view of the alternative embodiment of the handrail and toeboard system of FIG. 11, depicting the corner bracket with four (4) vertical plates orthogonally disposed, allowing the connection of two (2) toeboard members at a right angle, two (2) support plates, mounting hardware for toeboards and vertical handrail support, and flanges for securing the system to the floor.

FIG. 12 shows a side view of bracket 500 having toeboards 508 and 512 secured within receivers 506 and 510. From this view, it can be seen that the toeboards 508 and 512 and vertical support 504 make direct contact with the floor and are securely mounted within bracket 500. Bracket 500 is further secured to the floor using mounting hardware 518 inserted through the holes 517 formed in the flanges 516.

Figure 13:
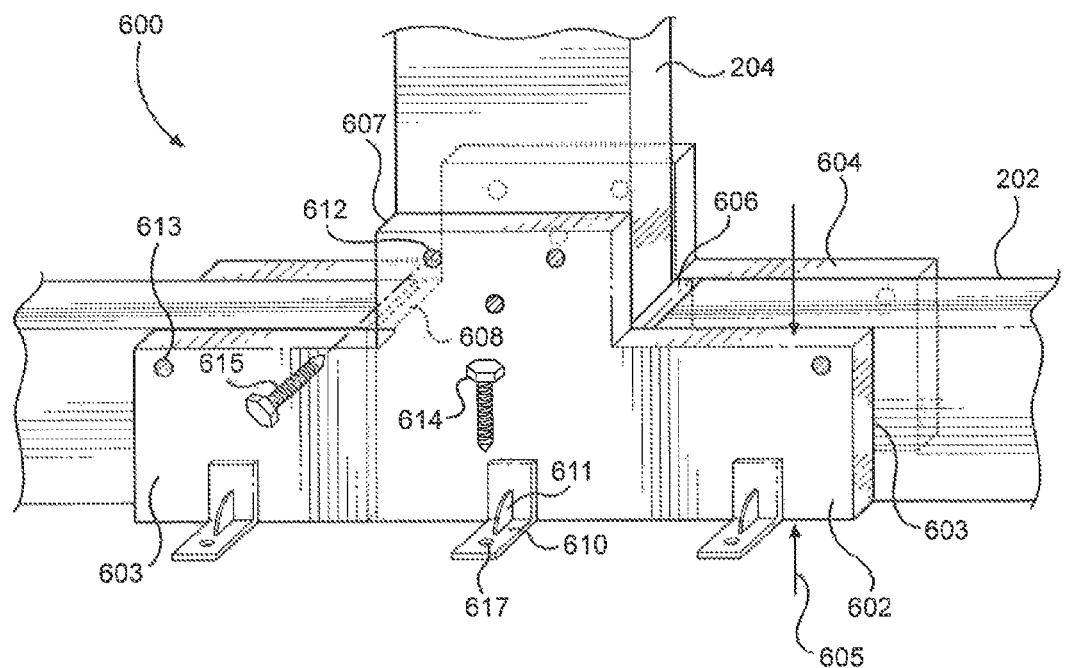
FIG. 13 is an perspective view of the top-front of an alternative embodiment of the handrail and toeboard system of the present invention depicting a bracket having two (2) vertical plates with the middle section of each plate extending perpendicularly upwards, similar to an inverted "T," with two (2) support plates connecting and securing the vertical plates together.

Referring now to FIG. 13, a perspective view of the top-front of an alternative embodiment of a bracket of the handrail and toeboard system of the present invention is shown and generally designated 600. Bracket 600 includes two vertical plates 602 and 604, each plate having a middle section extending perpendicularly upwards, similar in shape to an inverted "T." Vertical plate 602 and vertical plate 604 are spaced apart a predetermined distance to accommodate a standard sized piece of lumber and held in place by supporting plate 606 and 608, Supporting plates 606 and 608 are spaced apart from each other a predetermined distance to accommodate a standard sized piece of lumber, resulting in three distinct open ended sections: a center handrail support section to receive a handrail support 204, and two toeboard sections for receiving toeboards 202. The handrail support section has a greater height than the toeboard sections, providing a larger contact surface for the handrail support 204, increasing strength and stability of the overall system 100, The open bottom of the three sections of bracket 600 allow the handrail support 204 and toeboards 202 to sit flush against the ground, preventing material and debris from slipping under the toeboards 202.

Multiple flanges 610 are formed or otherwise attached to the base of bracket 600 providing a mounting point to the floor. The flanges 610 are spaced equally apart with one flange 610 located at the midpoint of vertical plate 602 with a flange 610 located on each side of the midpoint flange 610. Corresponding flanges 610 are located on the opposite &de of bracket 600. The locations of the flanges 610 provide localized and overall strength and stability to bracket 600 to withstand a minimum amount of force, such as the strength requirement to withstand a force of at least 200 pounds as outlined in California Code of Regulations. The flanges 610 each can be formed with a gusset 611 between the vertical and horizontal members to provide additional structural strength and integrity, Flanges 610 are formed with a hole 617 to accept mounting hardware 614 and serve as a mounting point to fasten bracket 600 to a supporting structure.

Each vertical plate 602 and 604 is formed with multiple holes 612 through which hardware, shown here as exemplary nail 615, can be driven or otherwise screwed or inserted, into handrail support 204 or toeboards 202 to secure the handrail support 204 or toeboards 202 in place.

Figure 14:
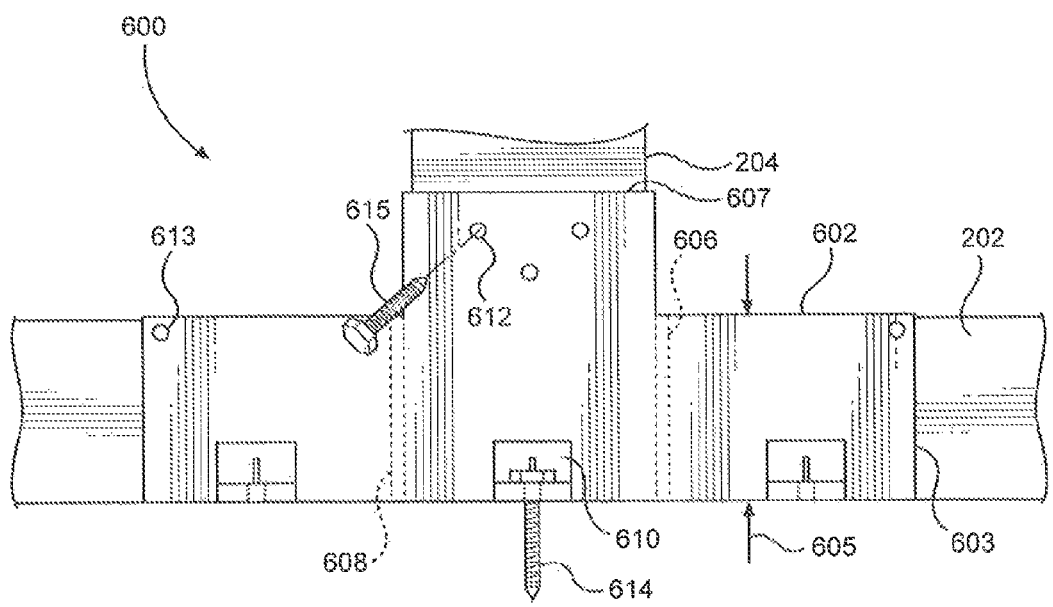
FIG. 14 is a side view of the alternative embodiment of FIG. 13, depicting a vertical plate with the middle section extending perpendicularly upwards, multiple holes formed in the vertical plates to receive mounting hardware for the toeboards and handrail support, and flanges for securing the system to the floor.

Referring now to FIG. 14, a side view of bracket 600 is shown, with toeboard 202 and handrail support 204 sitting flush on the ground. Mounting hardware 614 is inserted through flanges 610 securing the bracket 600 to the floor.

Likewise, mounting hardware 615 is shown as it would be inserted to mount handrail support 204. This Figure also shows the inverted "T" shape of the vertical plates 602 and 604 that provide a larger contact surface 607 in the area adjacent to the handrail support 204, increasing strength and stability of the system 100 with brackets 600 in use.

Figure 15:
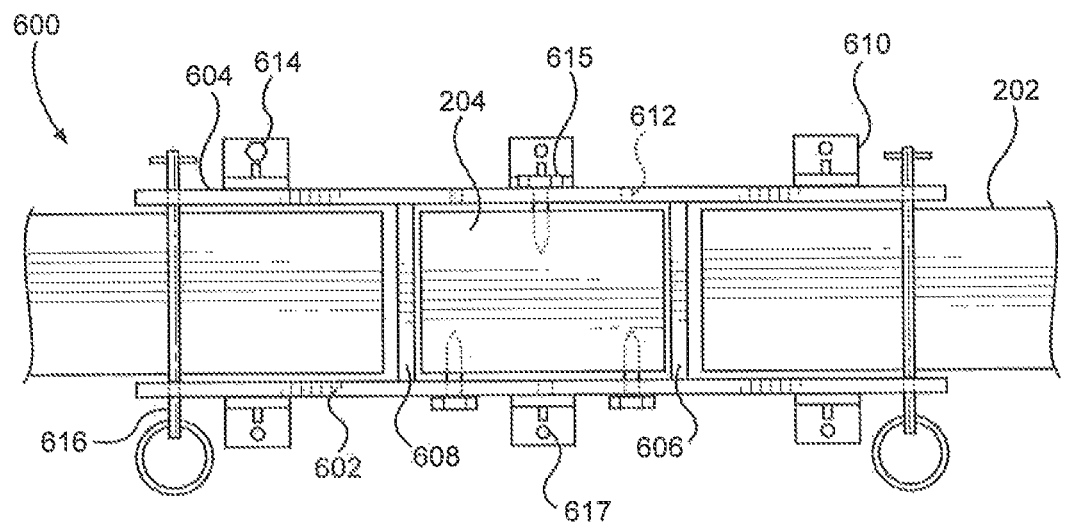
FIG. 15 is a plan view of the alternative embodiment of FIG. 13, depicting two (2) parallel plates, two (2) support plates creating open-ended sections to receive a vertical handrail support and two (2) toeboards, mounting hardware for the toeboards and handrail support, and flanges used to secure the system to the floor.

Referring now to FIG. 15, a plan view of bracket 600 is shown. Handrail support 204 is secured to bracket 600 by hardware 615 inserted through holes 612 of vertical plate 602 and 604. Toeboards 202 can be secured by additional hardware 615 driven or screwed into the toeboards 202, or by pins 616 as shown. Referring briefly back to FIGS. 13 and 14, the lateral portions 603 of vertical plates 602 and 604 are shown to have a height 605, corresponding substantially to the analogous vertical dimension of toeboards 202. In such an embodiment, mounting hardware 615 may be required to secure toeboards 202.

In an alternative preferred embodiment, the height 605 of vertical plates 602 and 604 are taller than the wooden members used for the toeboards 202, eliminating the requirement to drive any hardware into or through the toeboard 202 to secure it. In such a configuration, the holes 613 on vertical bracket 602 and 604 are aligned in a plane above the toeboards 202, allowing the pin 616 to move through both plates in a straight line and retain toeboard 202, similar to FIG. 2. Pins 616 then prevent the toeboards 202 from coming out of bracket 600 vertically while an additional bracket 600 at the opposite end of toeboard 202 secures the toeboard 202 horizontally in place.

Figure 16:
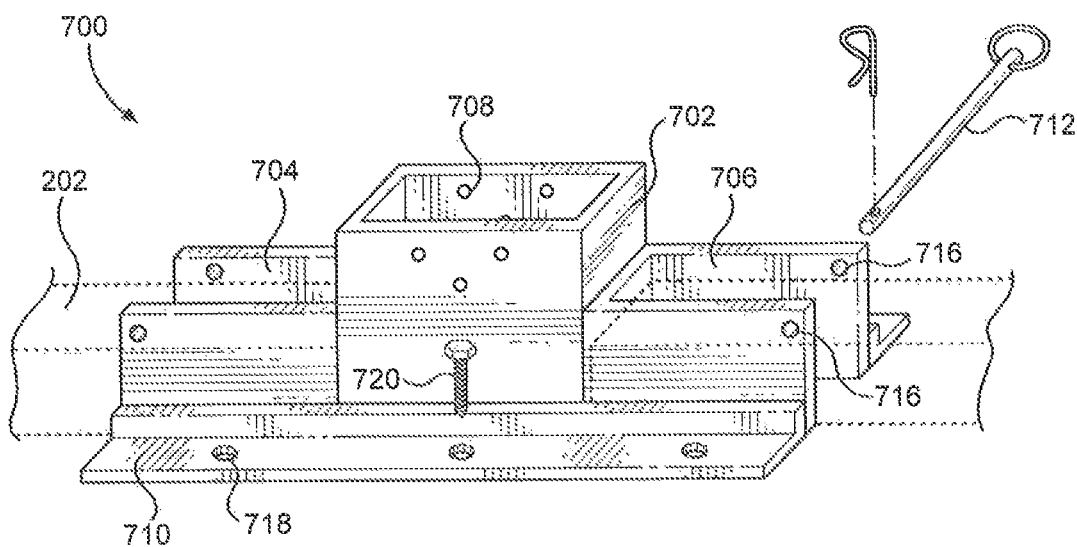
FIG. 16 is a perspective view of the top-front of an alternative embodiment of the handrail and toeboard system of the present invention depicting a bracket having a rectangular tube arranged vertically and sized to accept a handrail support, with sections of U-channel tubing disposed on opposite side of the rectangular tube sized and oriented to receive toeboards, and flanges used to secure the system to the floor.

Referring now to FIG. 16, a perspective view of the top-front of an alternative embodiment of a bracket of the present invention is shown and generally designated 700. Bracket 700 is formed of a rectangular tube 702, sized to accommodate standard sized lumber, with several holes 708 formed in the tubing to receive mounting hardware and serve as mounting points for the handrail support 204 (not shown). Rectangular tube 702 further has two U-channels 704 and 706 formed to, or otherwise attached to rectangular tube 702, oriented such that the open portion of the U-channels 704 and 706 for receiving toeboards 202 are oriented away from and on opposing sides of the rectangular tube 702. U-channels 704 and 706 dimensions are sized to receive standard-sized lumber as previously described. An embodiment of bracket 700 has a rectangular tube 702 with a greater height than U-channels 704 and 706, providing an increased contact surface for handrail support 204, increasing stability and strength. Formed or otherwise attached to each face of bracket 700 are flanges 710 which may be made of L-shaped steel or any material with the similar characteristics and dimensions. The L-shaped steel is formed with holes 718 on one side to accept hardware 720 for mounting. The side without holes are formed or otherwise attached to the side of bracket 700, with the length of the flange 710 extending the entire length of the bracket across U-channel 704, U-channel 706, and rectangular tube 702. On the opposite side of bracket 700 is another flange 710 formed or otherwise attached. The locations and structure of flanges 710 give the bracket 700 additional strength to withstand a minimum amount of force, such as the strength requirement to withstand a force of at least 200 pounds as outlined in California Code of Regulations. Flanges 710 are employed to mount bracket 700 to a structure and provide lateral stability and structural strength to system 100 when mounted to a structure.

Pin 712 may further be employed, being inserted through holes 716 in the U-channels 704 and 706 preventing toeboards 202 from moving vertically out of the U-channels 704 and 706, similar to the structure of previous embodiments.

Figure 17:
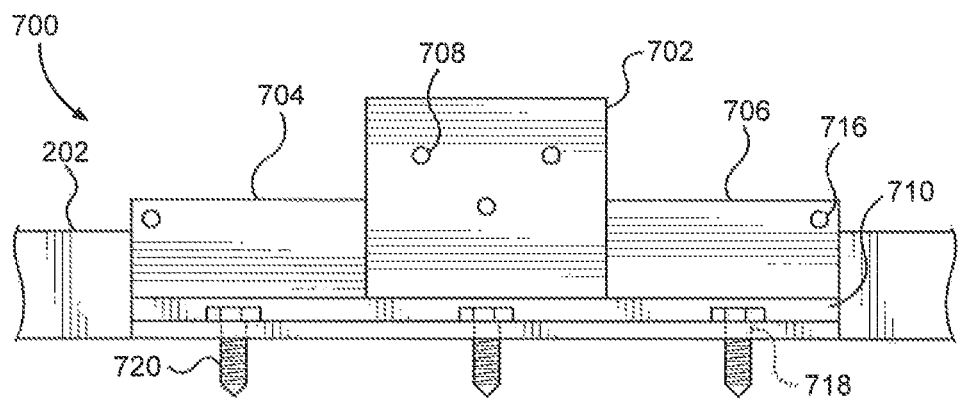
FIG. 17 is a side view of the alternative embodiment of the handrail and toe board system bracket of FIG. 16, depicting the center rectangular tubing extending above both U-channel tubing sections, holes formed in each portion to accept mounting hardware, and flanges used to secure the system to the floor.

Referring now to FIG. 17, a side view of bracket 700 is shown, and depicts the rectangular tube 702 and U-channels 704 and 706 disposed on opposite sides of rectangular tube 702. In a preferred embodiment, all three sections have open ends to allow toeboards 202 and handrail support 204 to directly contact the floor.

By utilizing U-channels 704 and tube 702, the manufacturing complexity can be significantly reduced, which results in a corresponding decrease in manufacturing costs. The use of pre-formed U-channel and tubing 702, which can be cut to length for implementation in the present invention allows for the reduction in the costs of materials to manufacture the present invention. Moreover, the manufacturing effort required to form the devices of the present invention are significantly decreased when the formation can be achieved through the selective attachment of U-channel and tube pieces, such as through welding, instead of the option requiring the complex welding of discrete metal sheeting.

Figure 18:
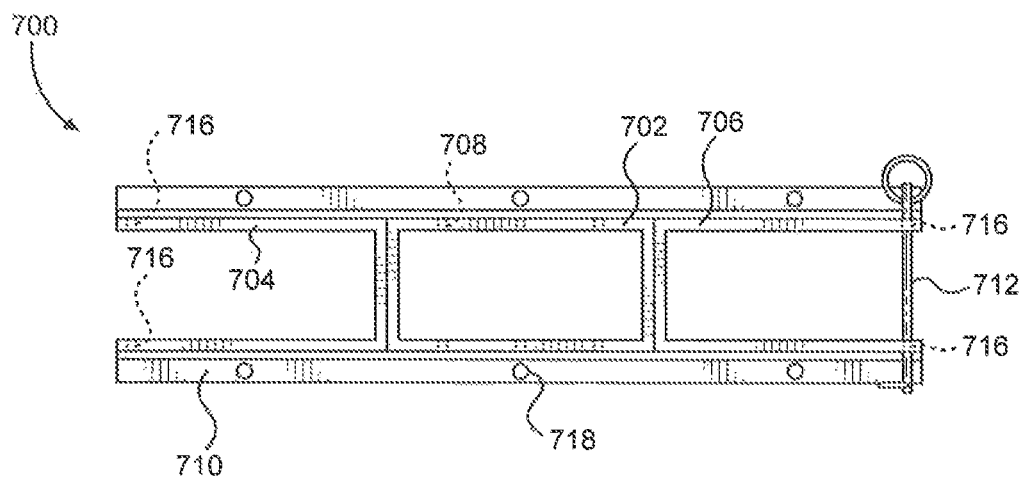
FIG. 18 is a plan view of the alternative embodiment of the handrail and toe board system bracket of FIG. 16, depicting center rectangular tubing with U-channel tubing disposed on opposite sides, and flanges used to secure the system to the floor.

Referring now to FIG. 18, a plan view of bracket 700 is shown, depicting the rectangular tube 702 where U-channel 704 and U-channel 706 are formed or otherwise attached to opposite sides of the rectangular tube 702, The U-channels 704 and 706 are shown with holes 716 to receive a pin 712 and prevent the toeboards 202 from moving upwards and out of bracket 700.

Figure 19:
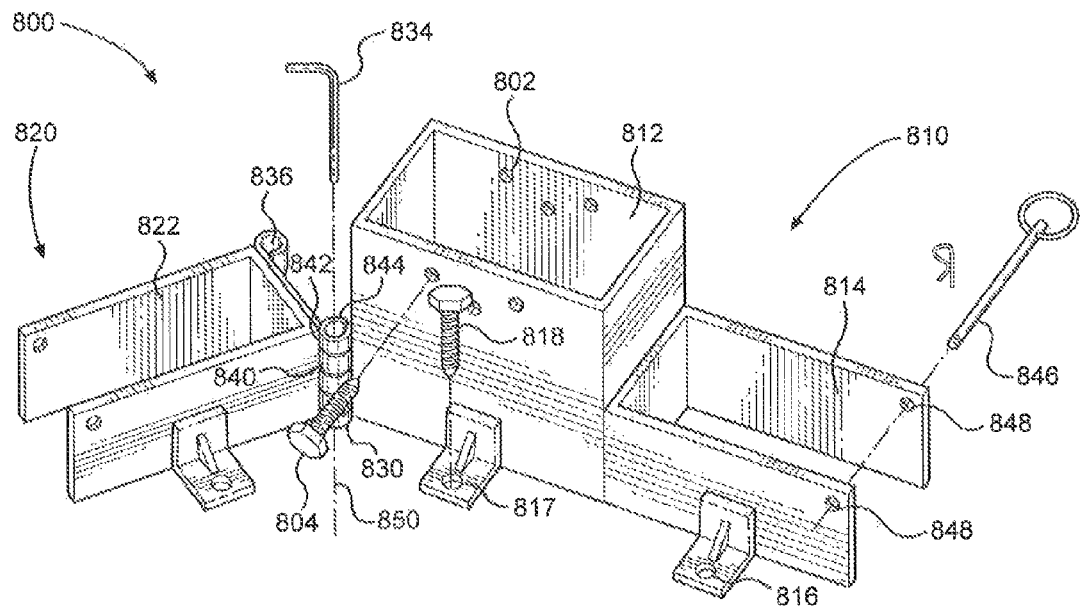
FIG. 19 is an perspective view of the top-front of alternative embodiment of the handrail and toeboard system of FIG. 19 depicting a primary section selectively connected to a secondary section by one of two (2) hinge assemblies, allowing angular adjustment between the primary section and secondary section, holes formed to accept mounting hardware, and flanges used to secure the system to the floor.

Referring now to FIG. 19, a perspective view of the top-front of an alternative embodiment of a bracket of the present invention is shown and generally designated 800. Bracket 800 incorporates a primary section, generally labeled 810, and a secondary section, generally labeled 820, joined together at hinge assemblies 830 and/or 832. Primary section 810 is formed from a rectangular tube 812 formed or otherwise attached to a U-channel 814. The U-channel 814 is formed to or otherwise securely attached to the rectangular tube 812, creating a singular component. The rectangular tube 812 can have a generally greater height than U channel 814 providing more contact area to the handrail support 204, increasing the strength and stability. U-channel 814 is sized to accept a toeboard 202, while the interior dimensions of rectangular tube 812 are sized to accept a hand rail support 204 as in previous embodiments. Secondary section 820 is formed as a U-channel 822, also sized to accept a toeboard 202 as previously described.

Both the primary section 810 and the secondary section 820 are formed with multiple holes 802 sized to accept hardware 804 used to secure toeboards 202 or handrail supports 204 as in previous embodiments.

Multiple flanges 816 are also formed or otherwise attached to the base of primary section 810 and secondary section 820, each formed with a hole 817 sized to accept mounting hardware 818. Mounting hardware 818 is used to secure bracket 800 to the structure as in previous embodiments. Gussets 819 may further be formed to the flanges 816, increasing strength of the bracket 800.

In an embodiment, pins 846 can be inserted through holes 848 formed in each of the U-channels 814 and 822 to secure toeboards 202 in use. Alternatively, holes similar to previous embodiment may also be formed in the U-channels 814 and 822 and sized to accept mounting hardware, securing toeboards 202.

In an alternative embodiment, at least one hinge assembly 830 or 832 selectively joins primary section 810 to secondary section 820, providing flexibility in selection of the horizontal angle to which the bracket 800 is set. Hinge assemblies 830 and 832 allow the bracket 800 to be set to a particular angle allowing use of a bracket 800 at a corner, similar to the embodiment of FIG. 11, but without limiting the application to a single, fixed angle. Depending on which hinge assembly 830 or 832 is in use, the user may select a left or right angle (as viewed from above) as desired. Use of both hinge assemblies 830 and 832 simultaneously, provides a straight bracket, as neither hinge assembly 830 and 832 is allowed to pivot.

As is common in the art, hinge assemblies 830 and 832 (shown in FIG. 21) are formed from complementary, opposing barrels formed on opposite sides of the surfaces to be joined, with a pin inserted through the central lumen 844 created by the mated barrels creating a pivot axis 850 about which the hinge rotates. Hinge assemblies 830 and 832 are shown in this and the following Figures as a double barrel hinge. This characteristic should not be considered limiting, as many other variations of a detachable hinges are possible. In an alternative embodiment, double hinges may be incorporated allowing the primary section 810 and secondary section 820 to hinge both directions for 180 degrees.

As shown in this Figure, both of the vertical edges of the facing sides of the primary section 810 and secondary section 820 are each formed with barrels 836, 838 (shown in FIG. 21), 840, and 842, shown as having two leaves each. The primary section 810 has two barrels 838 and 842 that mate with complementary barrels 836 and 840 formed on the secondary section 820, facing the primary section 810. When the two sides of the complementary barrels 836-838, and/or 840-842 are mated together, a central lumen such as the central lumen 844 of the barrels 840-842 provide a clearance fit for the insertion of a retaining pin 834 completing the hinge assembly and allowing the primary section 810 and secondary section 820 to pivot about the pin 834. This provides the user the option to select which hinge assembly (830 or 832) to use, and set the appropriate angle for bracket 800 accordingly. In an embodiment, a portion of the central lumen of the hinge assembly 830 or 832 can be internally threaded to accept an externally threaded retaining pin 834, increasing the security of the hinge assembly 830 or 832.

Figure 20:
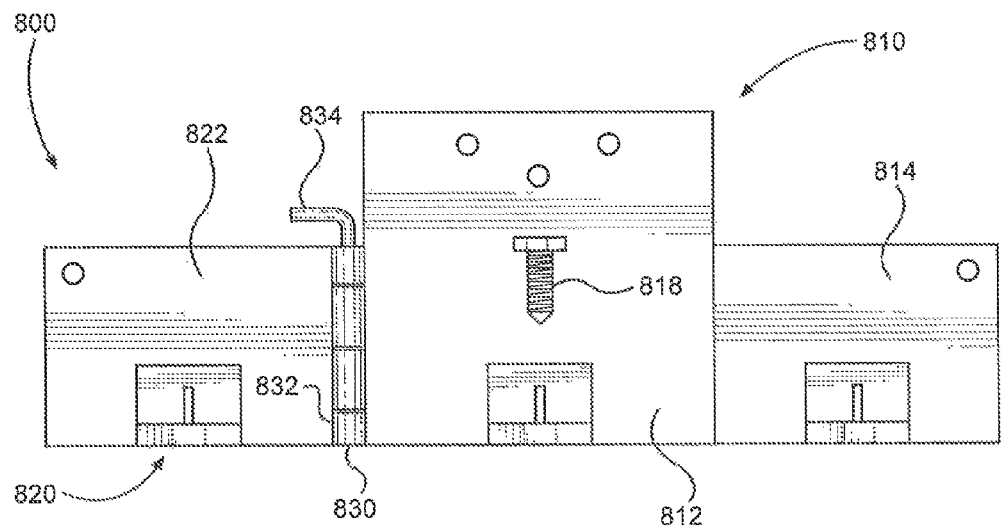
FIG. 20 is a side view of the alternative embodiment of the handrail and toeboard system of FIG. 19, depicting the side of the primary section and secondary section connected together by a double barrel hinge assembly, holes formed in the primary section and secondary section to accept mounting hardware, and three (3) flanges used to secure the system to the floor.

Referring to FIG. 20, a side view of bracket 800 is shown. The rectangular tube 812 is shown with greater in height than U-channel 814 of the primary section 810 and U-channel 822 of the secondary section; however this should not be considered as limiting. The height of the rectangular tube 812 can be the same as U-channels 814 and 822 or as high as practical providing increased stability and strength to bracket 800.

Figure 21:
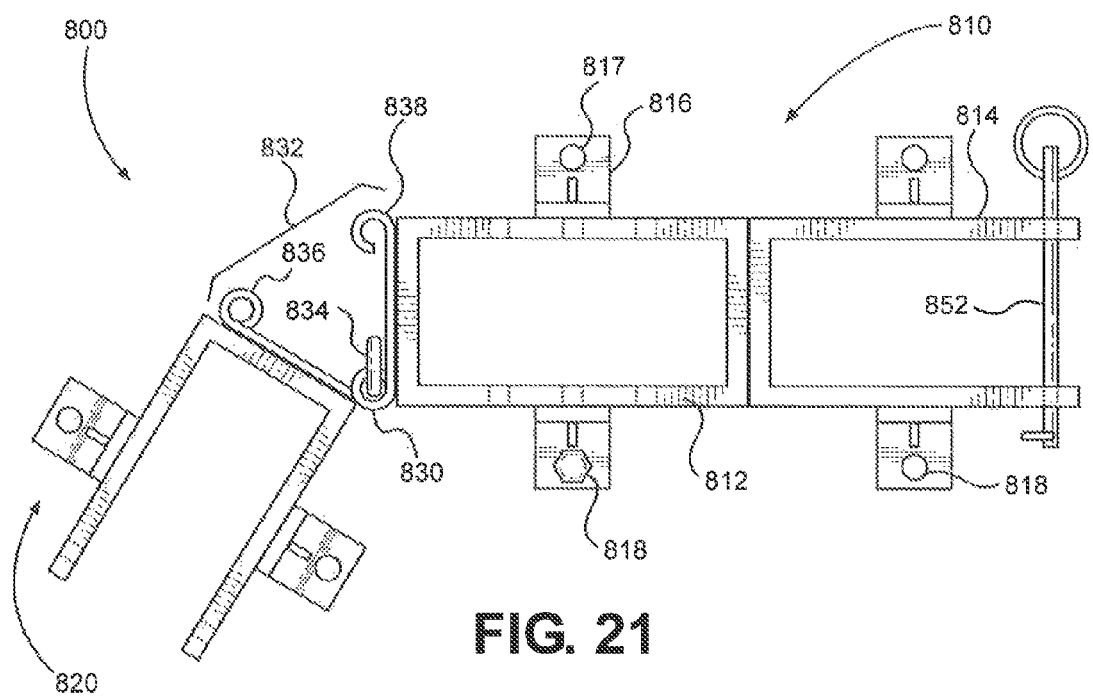
FIG. 21 is a plan view of the alternative embodiment of the handrail and toeboard system of FIG. 19, depicting a bracket with a primary section having a receive a vertical handrail support and a space to receive a toeboard, connected by one of two double barrel hinge assemblies to a secondary section having a space to receive a toeboard, both sections being formed with holes to receive mounting hardware, and flanges used to secure the bracket to the floor.

Referring now to FIG. 21, a plan view of the bracket 800 is shown, depicting hinge assembly 830 in use, with the secondary section 820 rotated away from the primary section about axis 850 defined by retaining pin 834 and hinge assembly 830. Barrels 836 and 838 are shown separated on the opposite side of the mating faces of primary section 810 and secondary section 820.

As shown, pin 834 is inserted through barrels 840-842, creating a pivot axis 850 between the primary section 810 and the secondary section 820. Placing a retaining pin in the alternate set of barrels 836-838 (completing hinge assembly 832) allows the sections to pivot in the opposite direction. By inserting a retaining pin 834 on both sets of corresponding barrels 836-838 and 840-842, the primary 810 and secondary sections 820 may be locked in a straight line.

Figure 22:
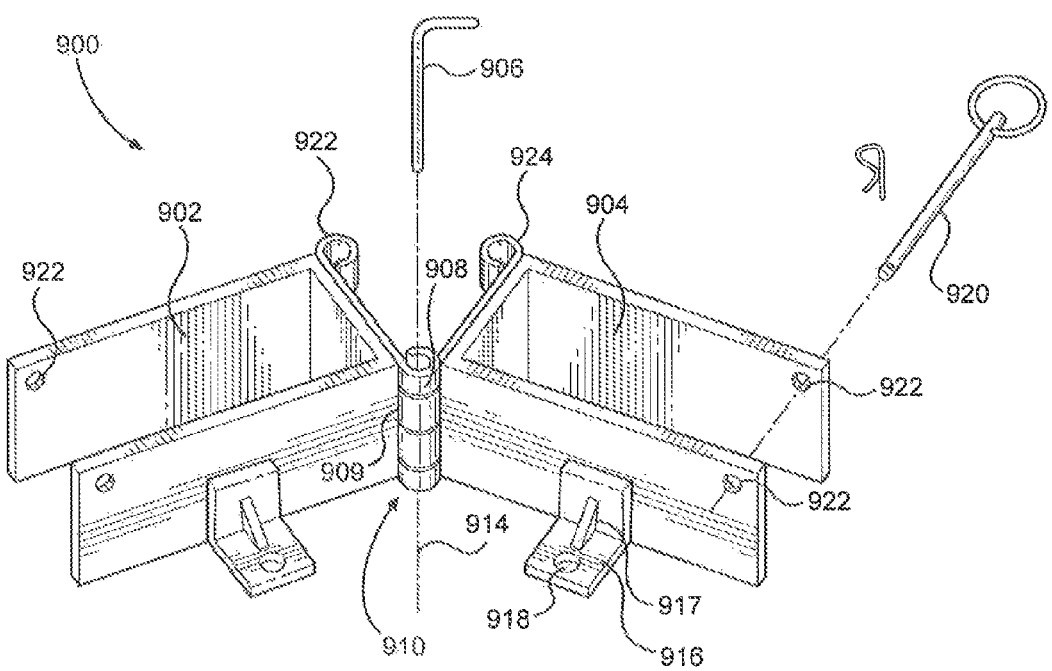
FIG. 22 is an perspective view of the top-front of an alternative embodiment of the handrail and toeboard system depicting a bracket comprising two (2) U-channels connected by one of two (2) double barrel hinge assemblies, allowing adjustment of the angle between the U-channels to accommodate various corner angles, holes formed in each U-channel sized to receive mounting hardware, and flanges used to secure the bracket to the floor.

Referring now to FIG. 22, an angular top-front view of an alternative embodiment of a bracket of the present invention, generally designated 900, is shown, comprising two U-channels 902 and 904 selectively joined with the use of a hinge assembly 910. Hinge assembly 910 has a barrel 908 (formed to U-channel 902) which mates with barrel 909 (formed to U-channel 904) creating a central lumen 911 and a clearance fit for the insertion of retaining pin 906. As in previous Figures, the use of a double barrel hinge assembly 910 should not be considered limiting, as other hinges known in the art are fully contemplated.

Retaining pin 906 defines a pivot axis 914 when inserted in central lumen 911, allowing the two U-channels 902 and 904 to be adjusted as required for the toeboard 202 angles. Barrels 922 and 924 are shown separated and rotated away from each other, but can, at the user's discretion, be mated together forming a hinge assembly 926 and secured with an identical retaining pin 907 in the same manner as hinge assembly 910 (shown in FIG. 24).

U-channels 902 and 904 are formed similar to previous embodiments, sized to accept standard-sized lumber for use as toeboards 202. The embodiment shown in this Figure is primarily for use with toeboards 202, given the lack of provisions for a handrail support 204.

This embodiment is further formed with multiple flanges 916 each with a hole 918 on the horizontal portion of the flange 916 sized to accept hardware 919 that serves to secure the bracket 900 to the structure. Flanges 916 are formed with gussets 917 for increased strength.

As with previous embodiments, a pin 920 is insertable through holes 922 formed in each U-channel 902 and 904 to secure a toeboard 202 once inserted into either U-channel 902 or U-channel 904.

Figure 23:
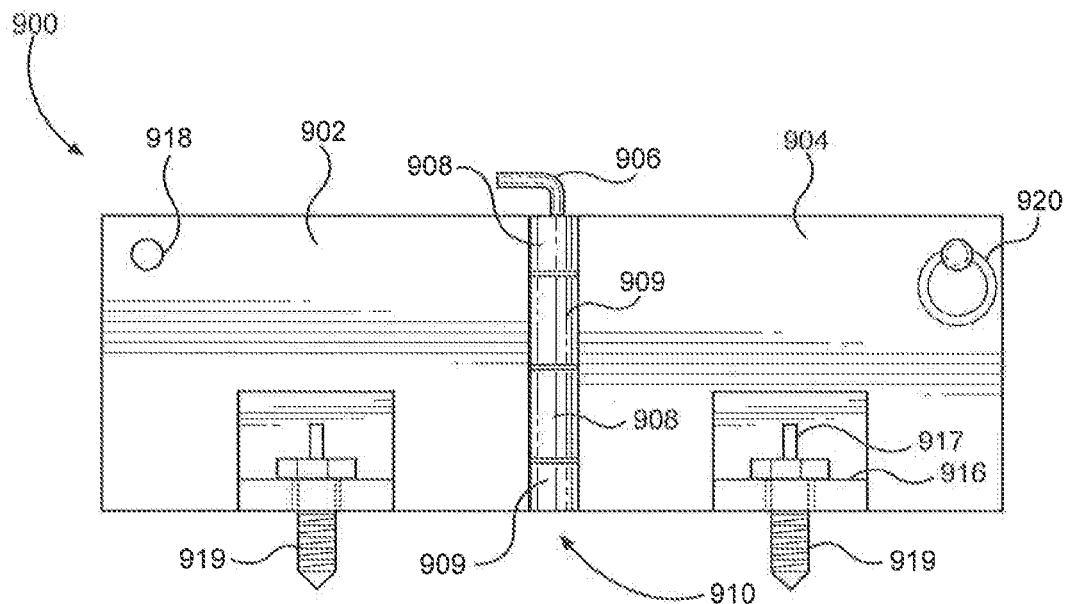
FIG. 23 is a side view of the alternative embodiment of the handrail and toeboard system of FIG. 22, depicting a bracket comprising two (2) U-channels, connected together by a double barrel hinge assembly, with holes formed the U-channels sized to receive mounting hardware, and flanges used to secure the bracket to the floor.

Referring now to FIG. 23, a side view of bracket 900 is shown, comprising two U-channels 902 and 904 connected together at hinge assembly 910. The height of the U-channels 902 and 904 are substantially the same, however the dimensions of the U-channels 902 and 904 can be modified to accommodate any standard sized lumber for toeboards 202.

Figure 24:
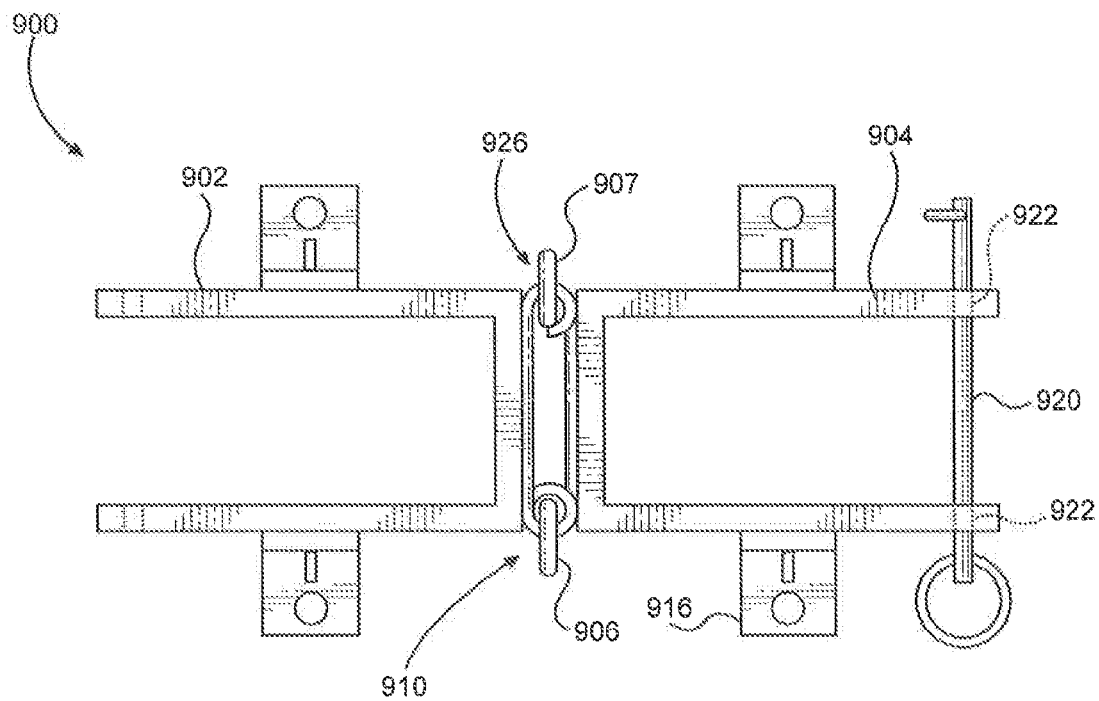
FIG. 24 is a plan view of the alternative embodiment of the handrail and toe board system of FIG. 22, depicting a bracket with two (2) U-channels connected together by two (2) double barrel hinge assemblies, locking the bracket in a straight line, with holes formed the U-channels sized to receive mounting hardware, and flanges used to secure the bracket to the floor.

Referring finally to FIG. 24, a plan view of bracket 900 is shown, showing the U-channels 902 and 904 connected together at both hinge assembly 910 and hinge assembly 926. As shown, the barrels 908-909 and barrels 920-922 of the hinge assemblies 910 and 926 are aligned and each has a retaining pin 907 or 908 inserted through them. By inserting both pins 907 and 908, the bracket 900 is locked in a straight line. Alternatively, by removing either pin 907 or 908, the bracket can be used to accommodate various angles for installation. Indeed, this embodiment of the present invention is universally adaptable to all installations of the construction safety handrail and toeboard system regardless of the floor plan of the worksite, allowing the articulation of the U-channel 902 to form an acute or obtuse angle with U-channel 904.

The various brackets 200, 300, 400, 500, 600, 700, 800, and 900 are used in combination to provide the construction safety handrail and toeboard system of the present invention. By utilizing the various brackets of the present invention, the system can be used on virtually any floor plan.

While there have been shown what are presently considered to be preferred embodiments of the present invention, it will be apparent to those skilled in the art that various changes and modifications can be made herein without departing from the scope and spirit of the invention.

The invention claimed is:

1. A safety handrail and toeboard system, comprising:
   a plurality of standard sized wooden members, at least one standard sized wooden member used as a handrail support, at least one standard sized wooden member used as a toeboard, and at least one standard sized wooden member used as a handrail;
   a plurality of successive brackets, wherein each said successive bracket comprises a first vertical plate and a second vertical plate of substantially equal dimensions oriented vertically and in a parallel arrangement, wherein said first vertical plate and said second vertical plate are each a single, continuous plate that spans the entirety of the successive bracket and forms one flat side of said successive bracket,
   a first support plate and a second support plate of substantially equal dimensions attached between, oriented vertically and orthogonally to said first vertical plate and said second vertical plate, thereby defining a center section, a first end section, and a second end section, said center section having an open top and an open bottom and sized to receive said handrail support extending vertically therefrom, each said first end section and said second end section having an open top, an open bottom and an open side, and sized to receive said toeboard,
   a first rectangular flange having a hole sized to accept mounting hardware extending perpendicular from said first vertical plate adjacent said first end section,
   a second rectangular flange having a hole sized to accept mounting hardware extending perpendicular from said first vertical plate adjacent said center section,
   a third rectangular flange having a hole sized to accept mounting hardware extending perpendicular from said first vertical late adjacent said second end section,
   a fourth rectangular flange having a hole sized to accept mounting hardware extending perpendicular from said second vertical plate adjacent said first end section,
   a fifth rectangular flange having a hole sized to accept mounting hardware extending perpendicular from said second vertical plate adjacent said center section, and
   a sixth rectangular flange having a hole sized to accept mounting hardware extending perpendicular from said second vertical plate adjacent said second end section; and
   wherein said successive brackets are mounted flush to a floor and said open bottoms of said hand rail support receivers allow said handrail supports to directly contact said floor to create zero clearance between said handrail supports and said floor and said open bottoms of said toeboard receivers allow said toeboards to directly contact said floor to create zero clearance between said toeboards and said floor.

2. The safety handrail and toeboard system of claim 1, wherein said first vertical plate at said first end section is formed with a first pin hole sized to receive a pin, said second vertical plate at said first end section is formed with a second pin hole sized to receive a pin, and wherein said first pin hole and said second pin hole are aligned in a plane at a height above said toeboard;
   said first vertical plate is formed with a third pin hole at said second end section sized to receive a pin, said second vertical plate formed with a fourth pin hole at said second end section sized to receive a pin, wherein said fourth pin hole and said third pin hole are aligned in said plane;
   a first pin removably inserted from said first pin hole and said second pin hole and passing over said toeboard to secure said toeboard between said first vertical plate and said second vertical plate; and a second pin removably inserted from said third pin hole and said fourth pin hole and passing over said toeboard to secure said toeboard between said first vertical plate and said second vertical plate.

3. The safety handrail and toeboard system of claim 2, wherein said first vertical plate and said second vertical plate further comprises a plurality of holes sized to accept mounting hardware.

\* \* \* \* \*

UNITED STATES PATENT AND TRADEMARK OFFICE
CERTIFICATE OF CORRECTION

PATENT NO. : 9,790,694 B2  Page 1 of 1
APPLICATION NO. : 13/854032
DATED : October 17, 2017
INVENTOR(S) : John House It is certified that error appears in the above-identified patent and that said Letters Patent is hereby corrected as shown below:

In the Claims

Column 14, Line 31, "late" should read --plate--

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*